United States Patent [19]
Akeel

[11] Patent Number: 5,796,229
[45] Date of Patent: Aug. 18, 1998

[54] METHOD AND APPARATUS FOR ROBOTIC FORCE CONTROLLED MATERIAL REMOVAL WITH PROGRAMMABLE OVERLOAD RELEASE FUNCTION

[75] Inventor: Hadi A. Akeel, Rochester Hills, Mich.

[73] Assignee: Fanuc Ltd., Yamanashi, Japan

[21] Appl. No.: 758,877

[22] Filed: Dec. 2, 1996

Related U.S. Application Data

[63] Continuation of Ser. No. 301,779, Sep. 7, 1994, abandoned.

[30] Foreign Application Priority Data

Sep. 10, 1993 [JP] Japan ................. 5-248492

[51] Int. Cl.$^6$ ........................ G05B 9/02
[52] U.S. Cl. ............ 318/563; 318/566; 318/434; 364/474.06; 364/474.2; 901/49; 310/109
[58] Field of Search ............. 318/563, 566, 318/568.17, 687, 434; 310/103, 109; 364/474.06, 474.09, 474.2; 414/730; 901/934, 49

[56] References Cited

U.S. PATENT DOCUMENTS

| | | | |
|---|---|---|---|
| Re. 34,870 | 3/1995 | Cummins et al. | 318/687 |
| 4,031,437 | 6/1977 | Dempsey et al. | 318/39 |
| 4,257,147 | 3/1981 | Moss | 310/103 X |
| 4,714,865 | 12/1987 | Chin et al. | 318/563 |
| 4,741,642 | 5/1988 | Carlton | 901/49 X |
| 4,797,564 | 1/1989 | Ramunas | 901/41 X |
| 4,848,546 | 7/1989 | McCormick et al. | 901/49 X |
| 4,915,574 | 4/1990 | Park et al. | 901/49 X |
| 4,925,360 | 5/1990 | Kato | 901/49 X |
| 4,954,005 | 9/1990 | Knasel et al. | 901/49 X |
| 4,995,493 | 2/1991 | Cotsman et al. | 901/49 X |
| 4,998,606 | 3/1991 | McCormick et al. | 901/49 X |
| 5,002,173 | 3/1991 | Hucul et al. | 901/49 X |
| 5,086,901 | 2/1992 | Petronis et al. | 901/49 X |
| 5,092,645 | 3/1992 | Okada | 901/34 X |
| 5,224,032 | 6/1993 | Wörn et al. | 364/167.01 |

*Primary Examiner*—Brian Sircus
*Attorney, Agent, or Firm*—Staas & Halsey

[57] ABSTRACT

An overload release apparatus for a robot supports a cutting tool such as an abrasive grinding wheel. A force sensor detects an amount of force applied to the cutting tool by a workpiece while a force release mechanism reduces the force applied to the cutting tool. The force release mechanism includes an electromagnet secured within a housing, a follower disposed within the housing which is allowed to move both linearly and angularly, and an elastic element interposed between an upper wall of the housing and the follower. During normal operation, the follower maintains contact with and is supported by a shoulder formed on an inner circumferential wall of the housing by an attractive force of an electromagnet. When a cutting tool, such as an abrasive cutting wheel, engages with an irregularity on a workpiece, an axial force and a moment are applied to the follower causing the follower to move both linearly and angularly inside the housing. The follower and the housing maintain contact through engagement between a toroidal shaped circular protrusion, formed on the follower, and a cylindrical surface disposed about a hole in the housing. Vibrations transmitted from the cutting tool to the follower are received by an elastic vibration damping medium which is interposed between the follower and the housing to thereby absorb high frequency vibrations.

7 Claims, 2 Drawing Sheets

000
METHOD AND APPARATUS FOR ROBOTIC FORCE CONTROLLED MATERIAL REMOVAL WITH PROGRAMMABLE OVERLOAD RELEASE FUNCTION

This application is a continuation of application Ser. No. 08/301,779, filed Sept. 7, 1994, now abandoned.

BACKGROUND OF THE INVENTION

1. Field of the Invention

The present invention relates to a method and apparatus for executing material removal using a robot equipped with a tool for grinding, defining and deburring. More particularly, the said invention relates to a method and apparatus for robotic force controlled material removal with a programmable overload release function which is capable of canceling a retaining relation between a tool and a robot when an overload applied to the tool retained by the robot exceeds a predetermined retaining force. The present invention also relates to disengaging the tool from the workpiece to be processed, and, as a result, releasing the overload imparted on the tool, thereby absorbing vibrations of the tool developed by the overloads encountered and preventing vibrations from being transmitted to the robot.

2. Description of the Related Art

When robots are used for material removal, for the purpose of executing machining processes such as grinding, defining and deburring a system including robots and tools supported by them may encounter occasional force overloads. Such overloads may cause vibrations in the system, instability in operation, and result in unsatisfactory performance. Possible damage to the robots, the workpiece, and the tooling (tools and related supporting parts, hereinafter referred to likewise) may also be encountered.

Force overloads are usually developed when the process tool, such as a grinding tool, encounters surface variations that are different from the tool path commanded by the robot. Surface variations result into changes in the amount of material to be removed, hence, the force required to remove it. When such changes in the surface are sudden, the tools and their support parts encounter excessive impact forces.

To avoid the damaging effect of force overloads, robots are occasionally provided with passive force relief mechanisms or apparatuses which respond to overloads by retracting the tools against a spring or pressurized air cylinder, thus maintaining overloads within acceptable limits.

However, with such devices, the robot cannot respond to surface variations and there is no feedback to the control system of the robot to correct for the unprogrammed motions of the overload relief mechanism. Relief mechanisms are also unidirectional, i.e., responding to forces in only one direction, such as normal to the workpiece surface, and therefore may transmit damaging forces acting in other directions.

Besides the above-described method employing the force release mechanism, a force control method is sometimes employed in a conventional system for solving the problems caused by overloading. In this method, the force exerted through a machining tool during a machining operation (hereinafter referred to as "machining reaction force") is detected as components in multiple directions, whereby the robot is relieved from the overloaded condition by being controlled in response to commands corresponding to the force components. The primary function of this method is to generate and supply a robot with the commanding signal to cause the robot to be separated and retreated from the workpiece in order to protect the robot from the overloaded condition, i.e., physical damage while maintaining the force required for removing the material from the workpiece.

However, the force control method is disadvantageous in that it cannot control the motion of the robot fast enough to respond to the rapid changes in the load condition, resulting in dynamic instability of the system thereby inviting vibration and poor performance in a material removing operation.

Until now, either the combination of the two methods or the possibility of the combination did not seem to have been considered viable, possibly due to the following reasons:

(1) Force overload relief has been always considered independent of the motion of the robot and incompatible with force control.

(2) Release mechanisms have not been invented wherein their force response characteristics can be changed according to the requirements of the process; they usually have a fixed, unidirectional release force level.

(3) Release mechanisms do not provide damping capability hence are incapable of damping the high frequency components of the machining reaction force, relieving the forces sensor from responding to the high-frequency components and causing instability in robot performance.

OBJECTS AND SUMMARY OF THE INVENTION

An object of the present invention is to provide a method and apparatus for removing material from a workpiece, wherein the robot is relieved from the requirement of having a high response by the addition of an interface device, i.e. an overload release mechanism, interposed between the robot and material removing tool that is capable of responding quickly to a change in machining forces acting on the tool in multiple directions during material removal processing.

According to the material removing method and apparatus of the present invention, the robot is capable of responding to changes in the principal machining conditions occurring within a low-frequency machining range, such as a change in machining surface condition and a change in a general application of force. The above-described overload relief mechanism is also designed to respond to a change in a high-frequency machining condition and sudden large changes in the load condition. Accordingly, not only can the material removal processing be performed smoothly but also stable operation of the machining system can be expected, thereby providing higher machining quality and efficiency.

A method for robotic force controlled material removal with a programmable overload release function according to the present invention comprises (1) a step of providing a robot with a force release mechanism capable of releasing multi-directional excessive process reaction forces and causing the force release mechanism to hold the material removal tool; (2) a step of providing the force release mechanism with a holding means having a programmable threshold value for holding the material removal tool; (3) a step of adjusting the threshold value to a predetermined level; (4) a step of providing the force release mechanism with a damping medium for preventing high-frequency components during a material removal process from being transmitted to the robot; and (5) a step of setting to a workpiece to be cut or ground a material removing tool capable of being withdrawn from the workpiece when the force applied to the workpiece for cutting or grinding during such machining operation has come to exceed the predetermined level, thereby seeking smooth and safe progress of the cutting or grinding operation.

According to such a material removal method of the present invention, high-frequency components of process reaction forces can be dampened in order to be prevented from being transmitted to the robot, thereby suppressing chatter or vibrations of the robot.

It is also possible to prevent the robot and tools from being damaged, since the overload release mechanism prevents overload due to the process reaction forces from exceeding predetermined limits in multiple directions.

Furthermore, it is possible to prevent high-frequency components of process reaction forces from being transmitted to a force sensor installed on the tool supporter of the robot, thereby allowing a relatively cheaper sensor chiefly responsive to low-frequency components to be used for the force control of the robot.

A second aspect of the present invention provides an apparatus for robotic force controlled material removal with a programmable overload release mechanism, the overload release mechanism comprising: a tool support means for supporting a material removal tool; a follower means integrally moving with the tool support means; an electromagnet means secured to a robot for maintaining a position of the follower means with respect to the robot; a means for setting a magnitude of retaining force in a relative motion between the follower means and the robot; a guide means for guiding the follower means when a load exceeding the retaining force is transmitted from the material removal tool, in such a manner that the guide means allows the follower means to move both linearly and angularly; and an elastic means having a capability of elastically restricting displacement of the follower means and damping vibrations of the follower means.

Such an overload release mechanism in the material removal apparatus in accordance with the present invention brings the following advantageous effects:

Forces and moments of overloads acting on the machining tool attached to the robot can be moderated in multiple directions;

The threshold for releasing overloads can be varied, which enables the apparatus to be applied under various machining conditions requiring various load limits ranging from a small force for polishing to a large force for grinding;

The threshold for releasing overloads can be programmed, which allows the apparatus to execute a real time adjustment of compliance and a release force limit in accordance with changes of processes, and also assures functioning as an interface to an electronic process controller; and Vibrations resulting from the release of overload can be attenuated, thereby preventing vibrations from causing damage and maintaining stability of the material removal process.

The material removal means based on the force control adopted in the method and apparatus of the present invention can be constituted by a force sensor and an overload release mechanism which are commercially available.

When the material removal tool, carried on the robot, encounters steep surface variations on the workpiece, a large machining force is normally required to obtain a desired machining line. When a large machining force acts on the workpiece, a tool receives a reaction force, i.e. a large machining reaction force, at an edge thereof. Such machining reaction forces, as loads, are transmitted to various portions of the tool, the tool supports, and the robot arm (mounting flange) etc. The machining reaction forces can occur in various directions, and the load, induced by the machining reaction force, includes both force components and moment components.

According to an embodiment of the present invention, when the load derived from such multi-directional machining reaction forces exceeds a predetermined limit, i.e., when an overload has occurred, the tool and the tool support, i.e., tooling, are allowed to move both linearly and angularly from the predetermined position with respect to the robot, thereby relieving excessive process reaction forces or overloads. On the other hand, the damping means elastically restricts the motion of the tooling including those for overload releasing, and absorbs and attenuates high-frequency components of motions, thereby securing stability of the system.

When an electromagnet is employed as a means for holding the tooling at a predetermined position, the machining reaction force release level can easily be programmed by programming the magnetic force of the electromagnet. The setting of magnetic force of the electromagnet, for determining the release level of the process reaction force, can be done either by an operator each time processes are executed, or can be programmed by incorporating a statement for setting/changing magnetic force into a teaching program.

When the overload is released, a force of the electromagnet for restricting the motion of the tool system is quickly weakened, potentially causing the tool system to be vibrate; however, the damping means elastically restricts the motion of the tool system, while absorbing and attenuating high-frequency components of the motions, whereby excessive or random motions of the tool system are adequately suppressed, and unnecessary reduction of the machining forces is prevented. Accordingly, this effectively suppresses vibrations of the tooling. With this vibration suppressing function of the damping means, the robot is isolated from the high-frequency components of load changes. Thus, in the case where robot control based on force control is combined, the robot is no longer required to undergo position control in response to the high-frequency components of the loads. Accordingly, relatively cheaper force sensors and signal processing circuits can be used to execute the robot control for maintaining machining forces or their reaction forces within predetermined levels or ranges.

In other words, in the case where the force control method is combined, the low-frequency components of load changes are coped with by robot position shift according to the force control while the high-frequency components of load changes are coped with by a force release function of the force release mechanism and by a motion absorbing function of the damping means. Thus, extremely rational role sharing is realized with respect to the low-frequency components and the high-frequency components of the load changes.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
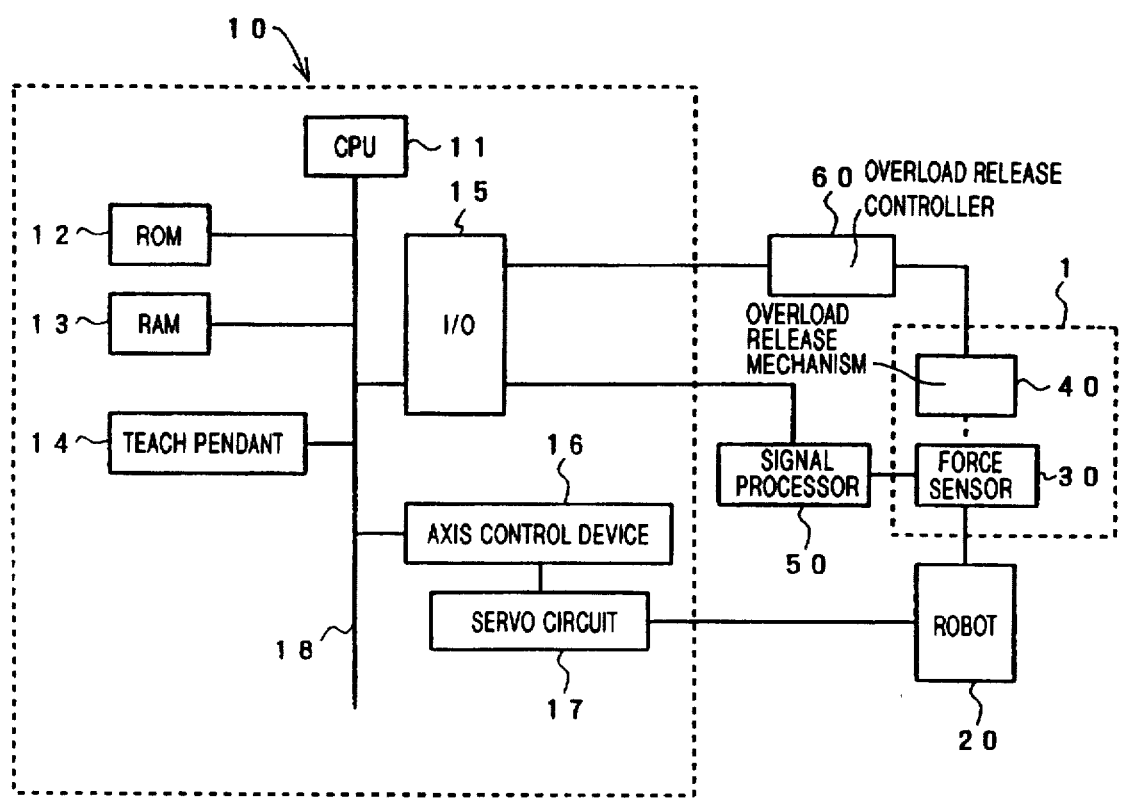
FIG. 1 is a block diagram showing a principal part of a system configuration used for embodying a method according to the present invention.
Figure 2:
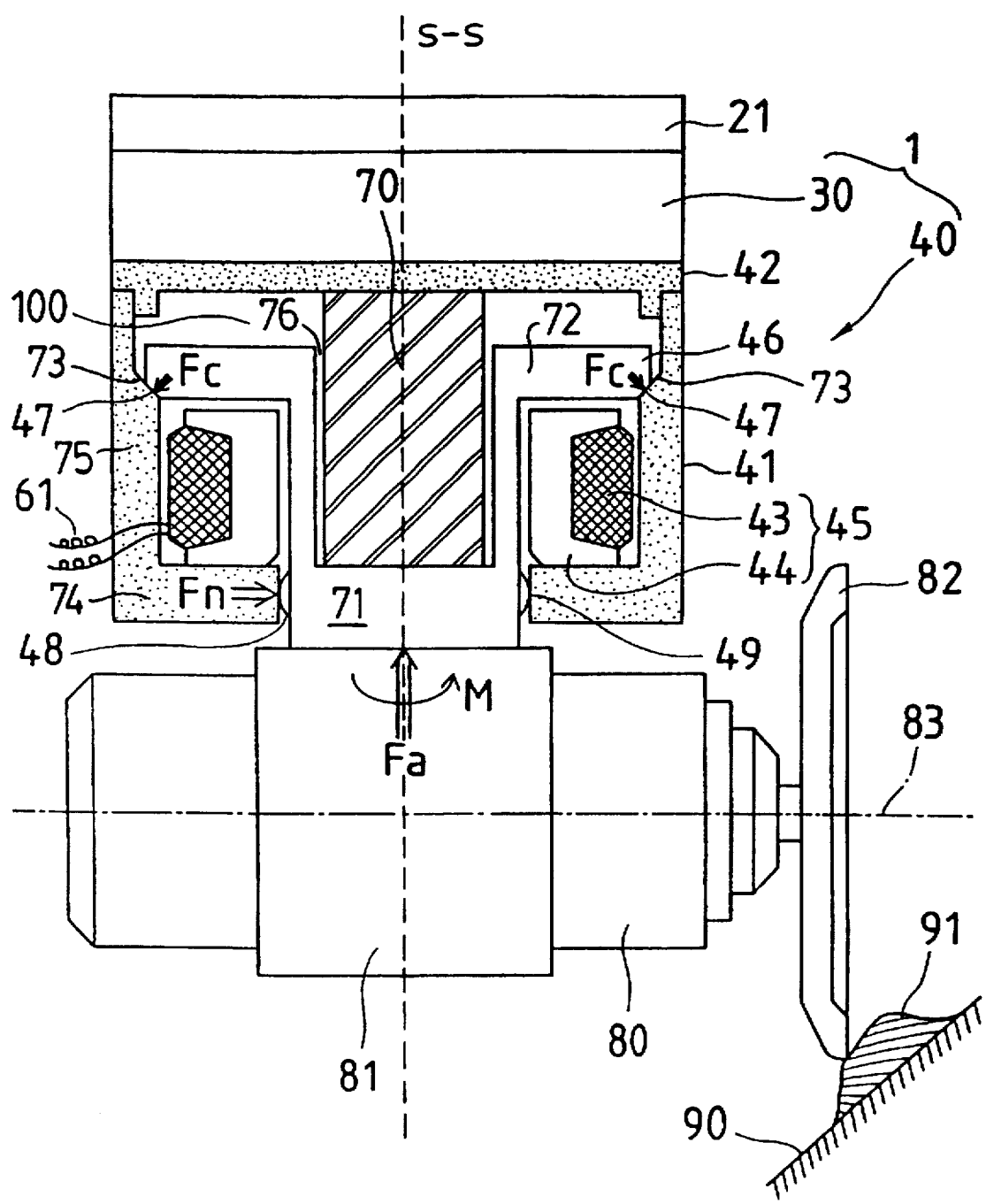
FIG. 2 is a view typically showing one example of an overload release apparatus incorporated into the system shown in FIG. 1 for executing a material removal method of the present invention.

FIG. 1 is a block diagram showing a principal part of the system configuration used for embodying a method of the present invention, and FIG. 2 is a view typically showing the structure of an overload release apparatus incorporated into the system of FIG. 1. Hereinafter, with reference to these drawings, the present invention will be explained in greater detail.

As illustrated in FIG. 1, the system as a whole comprises a robot controller 10, a robot 20 controlled by the robot controller 10, a force sensor 30 supported on a distal end of an arm of the robot 20, an overload release mechanism 40 supported on the robot 20 through the force sensor 30, a signal processing unit 50 for processing the signals detected by the force sensor 30, and an overload release mechanism controller 60 for controlling the force release threshold, i.e., electric current to be fed to an electromagnet, (which will be explained later) of the overload release mechanism 40. Hereinafter, the combination of the force sensor 30 and the overload release mechanism 40 is referred to as an overload release apparatus 1.

The robot controller 10 includes a central processing unit 11 (hereinafter referred to as a "CPU"), which is connected through a bus 18 to various components, such as a memory 12 of ROM, a memory 13 of RAM, a teach pendant (i.e. a hand-held device used to instruct a robot) 14 equipped with a keyboard for inputting various commands or setting data required in the teaching of the robot and operations of other system components, an I/O unit 15 functioning as an interface between the signal processing unit 50 for processing the detected signals of the force sensor 30 and the overload release mechanism controller 60 for controlling the force release threshold of the overload release mechanism 40, and an axis control device 16 for controlling axes of the robot 20 via a servo circuit 17.

The force sensor 30, mounted on a distal end of an arm of the robot 20, may be a known type with built-in strain gauges and a plurality of bridge circuits driven by alternate current from an oscillator. The force sensor 30 generates signals representing 6 components of axial forces and moments, and supplies these signals to the detected signal processing unit 50. Operations in the signal processing unit 50 are, for example, as follows. The detected signals, after being amplified in differential amplifiers, are converted into DC signals through synchronous rectification and then fed to a multiplexer. The multiplexer responds to control signals received through the I/O unit 15 from the CPU 11 of the robot controller 10, and successively sends out signals representing detected output components of various sensors to the I/O unit 15 through a sample hold circuit and an A/D converter.

Besides the programs for controlling operations of the robot controller 10 itself and teaching programs of the robot, the ROM 12 and the RAM 13 previously store, together with related setting data, a force control program for: executing a series of processings such as those for controlling the exchange of the signal with the signal processing unit 50; calculating a displacement of the robot position to be fed to the robot, based on the detected signals received through the I/O unit 15; and giving a command to the axis control unit 16 in accordance with the result of calculation.

On the other hand, the overload release mechanism controller 60, which is connected to the overload release mechanism 40, the I/O unit 15 and an electric power source (not shown), is provided with a built-in variable electric power source (not shown) and receives control signals from the CPU 11 and the I/O unit 15 in accordance with commands inputted from the teach pendant 14, thereby increasing or decreasing the force release threshold (i.e. a current value to be fed to the electromagnet) of the overload release mechanism 40 to programmably control the force release level.

Next, with reference to FIG. 2, the structure and function of the overload release apparatus 1 used in the system shown in FIG. 1 will be explained in greater detail. In the drawing, devices and elements corresponding to those disclosed in FIG. 1 are designated by the same reference numerals.

In FIG. 2, the overload release apparatus 1 is connected to the distal end of the arm of the robot. More specifically, provided at the distal end of the robot arm is a flange 21 to which the force sensor 30 is fixed by way of a mechanical fastener, not shown. The overload release apparatus 1 includes a housing 41 and a cover member 42. The cover member 42 is secured to the force sensor 30, thereby fixing the housing 41 to the distal end of the robot arm.

This housing 41 is a cylindrical casing consisting of a bottom 74 of circular cross section and a circumferential wall 75 integral with the bottom 74. An axis s—s passing through the center of the bottom 74 serves as an axial center of the overload release apparatus 1. A shoulder 73 is formed on the inside surface of the circumferential wall 75 at a predetermined height from the bottom 74 so as to extend in a circumferential direction. A circular through hole is formed at the center of the bottom 74. A reference numeral 49 denotes an inner peripheral wall of this through hole.

The housing 41 contains an electromagnet 45, comprising an electromagnetic coil 43 and a core 44 made of a ferro magnetic material, and a follower 46, which is also made of a ferro magnetic material and interacts with the electromagnet 45 to attract in response to the magnetic field generated by the electromagnet 45.

The follower 46 includes a cylindrical shaft portion 71 having an axis parallel to the axis s—s of the overload release apparatus 1, and a disk portion 72 integrally formed with the shaft portion 71 by extending radially from the upper end of the shaft portion 71 along a plane normal to the axis of the shaft portion 71. A support surface 47 is formed with an obliquely cut surface of a circumferential corner of the disk portion 72 where the outer peripheral end surface of the disk portion 72 intersects with the lower surface of the disk portion 72. The follower 46 in the housing 41 is carried on the housing 41 with the support surface 47 mounted on the shoulder 73 of the housing 41. The disk portion 72 confronts the core 44 of the electromagnet 45 as long as the follower 46 is carried on the housing 41.

A circumferential protrusion 48, having a toroidal shaped surface, is formed along the circumferential direction of the shaft portion 71 of the follower 46, confronting the internal circumferential wall 49 of the bottom 74 of the housing 41.

With this arrangement, the follower 46 is guided by way of the circumferential protrusion 48 along the inner circumferential wall 49 of the through hole formed in the bottom 74 of the housing 41, thus allowing both relative sliding and inclined relative rotational motions while maintaining the contact between the follower 46 and the housing 41.

The shaft portion 71 of the follower 46 has a cylindrical hollow 76 with a predetermined diameter and a predetermined depth which extends centrally along the axis of the shaft portion 71. An elastic element 70, positioned in the cylindrical hollow space 76, has an upper end restricted by the cover member 42 of the housing 41 and a lower end restricted by the bottom of the cylindrical hollow space 76.

Thus, elastic force of the elastic element 70 pushes the shaft portion 71 of the follower 46 toward the housing 41 in a direction departing from the robot arm. As a result, the follower 46 and the housing 41 are coupled to form a united single rigid body.

Preferably, the elastic element 70 is made of a rubber with a high damping characteristic or polymer, or of conventional coil springs acting in parallel with a damping medium such as a shock absorber or a high damping rubber column.

Feed wires 61, 61 for supplying electric current to the coil 43 of the electromagnet 45 are connected to the overload release mechanism controller 60 shown in FIG. 1. When an operator designates the force release level (i.e. current level) through the teach pendent 14 to excite the electromagnet 45, the overload release mechanism controller 60 supplies electric current to the coil 43, thereby developing an attractive force between the follower 46 and the core 44 in accordance with the level of electric current supplied. This attractive force acts in parallel with the force applied by the elastic element 70, i.e. in the direction of the axis s—s, thus pushing the follower 46 to abut the housing 41 with the support surface 47.

As described previously, the current to be supplied to the coil 43 can programmably be controlled, so that the contact force Fc to act between the housing 41 and the follower 46 can programmably be set within a range between its highest level F1 and lowest level F2. For example, it will be possible to previously set a plurality of current levels I1, I2,- - -, In (stored in the RAM 13) corresponding to a plurality of force release levels suitable for the contents of the assumed machining processes, wherein I1 corresponds to the minimum force release level F2 and In to the maximum force release level F1. Thus, it becomes possible to adopt a system wherein the operator is allowed to select and designate a desirable force release level through the teach pendent 14 during execution of machining processes.

Also, it is conceivable to insert a statement for causing CPU 11 to execute designation/switching of force release level into the teaching program of the robot. According to this method, it will be feasible to designate the force release level for every teaching pulse.

The maximum force release level F1 and the minimum force release level F2 are respectively a matter of designer's choice; however, the former is dependent primarily on the sizes of the core 44 and the coil 43, while the latter is dependent on the force exerted from the elastic element 70 on the follower 46.

Just after the follower 46 separates from the housing 41 along the support surface 47, the compliance of the overload release mechanism is dependent on the intensity of the magnetic field generated by the electromagnet 45. Hence, because the intensity of the electromagnet is programmable, the compliance and frequency response of the overload release mechanism can be programmed for an optimum damping characteristic.

In a typical application, as shown in the drawing, the material removal tool 80 is coupled through the clamp 81 to the follower 46. More specifically, the material removal tool 80 is mounted on the clamp 81 fixed to the bottom of the shaft portion 71 of the follower 46. The material removal tool 80 usually includes an electric or pneumatic drive motor, and carries an abrasive wheel 82 driven by the drive motor. A rotational axis 83 of the abrasive wheel 82 intersects perpendicularly with the axis (i.e. axis s—s of the overload release mechanism 1) of the shaft portion 71 of follower 46.

During operation, the abrasive wheel 82 is rotated at high speed about the rotational axis 83 and moved by the motion of the robot flange 21 to approach and engage a workpiece 90, partially shown, having burr 91 to be removed. Once the abrasive wheel 82 engages with the burr 91, a force Fp is immediately generated, which causes material forming the burr 91 to be removed. The force Fp acts as an axial force Fa (i.e. a force acting in the direction of the axis s—s of the overload release mechanism 1), a normal force Fn (i.e. a force acting in the direction normal to the axis s—s) and a moment M on the follower 46.

Of these forces, the force Fa and the moment M act against the contact force Fc, causing the follower 46 to separate from the housing 41 along the contact surface 47. The contact force Fc is set so that the follower 46 remains in contact with the housing 41 as long as the force Fp is within a predetermined limit, or will not exceed a force release threshold.

If the force Fp exceeds such predetermined limit in the removal of the burr 91, the axial force Fa and the moment M are correspondingly increased. As a result, the force of the electromagnet 45 attracting the disk portion 72 of the follower 46, which corresponds to the contact force Fc acting between the housing 41 and the follower 46, exceeds the force Fp, causing the disk portion 72 of the follower 46 to disengage from the shoulder 47 of the housing 41 and move within the space 100 against elastic force of the elastic element 70. Thus, the abrasive wheel 82 integral with the follower 46 is retracted away from the workpiece 90, so that the tool and its retaining mechanism can be protected from overload even when the tool is subjected to an excessive machining reaction force.

The movement of the follower 46 continues until the force Fp comes to balance with forces of the electromagnet and the elastic element 70. The circumferential protrusion 48, formed on the follower 46, allows the follower 46 to move both linearly and angularly relative to the housing 41 without loosening the contact with the housing 41. Thus, accurate definition of the location of the abrasive wheel 82 with respect to the workpiece 90 is assured for a proper robot material removal function of the robot.

When the force Fp is smaller than such balancing force, the disk portion 72 of the follower 46 is pulled by the electromagnet 45 to be supported by the housing 41 on the shoulder 47.

This process of overload release is activated regardless of the direction of the force Fp, although the limit of Fp may vary with its direction.

When the disk portion 72 of the follower 46 is separated from the housing 41 along the shoulder 47, vibrations could be induced due to the variations of the machining reaction force Fp acting on the mass of the tool 80 and the equivalent elastic effect of the elastic element 70 and the electromagnetic field generated by the electromagnet 45. This vibration can be absorbed by providing the elastic element 70 with proper damping characteristic, which is a matter of engineering design. The damping characteristic is dependent on the material of the elastic element 70; however, the general damping characteristic can also be adjusted by internally providing the elastic element 70 with a dash pot. The vibration can also be attenuated by selectively determining the intensity of the magnetic field which affects the frequency response of the overload release mechanism.

Because of the above vibration damping function, the force sensor 30 mainly receives low-frequency components of the load, and this allows the use of a low-priced force sensor 30 not requiring high-frequency responsibility. During operation of the robot. The force sensor 30 detects signals representing low-frequency components of the load to be fed to the I/O unit 15 of the robot controller 10 through the signal processing unit 50, thus executing the robot position control in accordance with the force control program stored in the ROM 12 and the RAM 13. Such a robot control depending on the force control is well-known, and it is employed in the present invention as long as the robot position control is carried out in such a manner that the magnitude of the load detected is maintained within a predetermined level or range.

As apparent from the foregoing description, according to the method and apparatus of the present invention, it becomes possible to promptly and accurately release an excessive load derived from the multi-directional machining reaction forces which is developed when the material removal tool carried on the robot encounters with steep surface variations on the workpiece. As the program allows the threshold level for this overload release function to be set freely, it is possible to adequately respond to various process conditions, such as the type of the workpiece, mechanical strengths of the tool and its support, content of processes, etc.

For example, the following selection is feasible. When the mechanical strength of the tool support portion is not so high, the force release level can be set lower to prevent the tool support portion from being damaged. On the contrary, when a high-strength tool is to be used for quick material removal, the force release level can be set higher so that force can be applied continuously to the tool unless the tool receives an extremely large overload.

Furthermore, the present invention includes a damping means for elastically regulating the motions of the tool system, especially for absorbing and attenuating vibrations (high-frequency components of motions) which tend to occur when force is released, thus adequately suppressing vibration or random motions of the tool system and thereby also stabilizing the system even at the moment of the release of the overload.

Moreover, the present invention is highly rationalized by adopting the robot control based on the force control. Because of the vibration suppressing function provided by the damping means, the robot is isolated from high-frequency components of load changes. Thus, the robot is released from the need of the position control in response to the high-frequency components of the loads in executing the force control. Thus, relatively low-priced force sensor and signal processing circuits can be used for maintaining process forces or their reaction forces within the predetermined levels or ranges in controlling the robot. In other words, highly rationalized role sharing can be realized with respect to low-frequency components and high-frequency components of the load changes.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An apparatus for robotic force controlled material removal with a programmable electromechanical overload release mechanism, said electromechanical overload release mechanism comprising:

tool support means for supporting a material removal tool in contact with a workpiece;

a housing defining a space;

follower means disposed within the space of said housing and integrally moving with said tool support means, said follower means defining a cylindrical hollow;

electromagnet means disposed within the space of said housing for maintaining a constant relative position of said follower means with respect to said housing;

means for setting a magnitude of a force for maintaining a constant relative position of said follower means with respect to said housing;

programmable guide means for guiding said follower means in response to a program when a force exceeding said maintaining force is transmitted from the workpiece to said material removal tool, wherein said guide means controls said follower means to move both linearly and angularly;

elastic means disposed within the cylindrical hollow of said follower means and contacting the housing for elastically restricting displacement and damping vibrations of said follower means; and means for sensing the force applied to said material removal tool from said workpiece;

wherein said guide means retreats said material removal tool from the workpiece when the sensed force exceeds a programmed threshold value.

2. A material removal apparatus in accordance with claim 1, wherein said means for sensing is a force sensor interposed between said overload release mechanism and said robot and produces an output in response thereto, further comprising means for transmitting the output signal of said force sensor to said guide means to provide said robot with a command which adjusts the position of said material removal tool relative to the workpiece in response to the output signal of said force sensor.

3. An electromechanical robotic force controlled material removal apparatus, comprising:

a housing defining an inside space and attached to a distal end of a robot arm;

an electromagnet having an electromagnet coil fixed within said housing;

a follower disposed within the inside space of said housing and movable when multi-directional linear and rotational motions are given to said follower, said follower including:

a disk-like portion disposed within the inside space of said follower and magnetically attracted by a magnetic attraction force of said electromagnet, and a shaft portion connected to the disk-like portion and defining a cylindrical hollow such that a lower end protrudes from a bottom of said housing, said lower end being fixed to a tool clamp for supporting a material removal tool;

engagement support means protruding inwardly within said housing and contacting the disk-like portion of said follower; and elastic engagement means disposed within the cylindrical hollow of said follower for maintaining contact between said follower and said housing thereby allowing said follower to move both linearly and angularly in the inside space of said housing;

means for adjusting electric current supplied to the electromagnetic coil of said electromagnet.

4. A material removal apparatus in accordance with claim 3, further comprising:

a force sensor interposed between a distal end of said robot arm and said housing for detecting a plurality of loads acting in and around axial directions, and producing an output in response thereto; and means for transmitting the output signal of said force sensor to a robot controller to provide a command for position adjustment relative to a workpiece.

5. A method for robotic force controlled material removal through a robot having a programmable electromechanical force release mechanism connected to a material removal tool by a damping medium, the electromechanical force release mechanism comprising:

a housing, an electromagnet located within the housing, a follower with a disk portion located within the housing and a shaft portion connected to the disk portion and the material removal tool, the shaft extending out of the housing.

an engagement support within the housing, an elastic engagement means which applies a mechanical force which causes the follower to contact the engagement support, a means for adjusting electric current in the coil which causes the electromagnet to apply an electromagnetic force on the follower; said method comprising the steps of:

setting initial threshold values of holding strength for the force release mechanism wherein the damping medium absorbs some of the vibration produced through material removal by said material removal tool;

holding the material removal tool with the force release mechanism set to the initial threshold values;

adjusting the initial threshold values to a desired level during a test material removal operation;

applying the material removal tool to a workpiece; and retreating the material removal tool from the workpiece when a force acting on the tool has exceeded the adjusted threshold values.

6. The method according to claim 5, wherein the robot further includes a force sensor disposed between said material removal tool and a distal end of a robot arm, said method further comprising the steps of:

detecting a load transmitted from the material removal tool to the robot by the force sensor; and adjusting a relative position between the material removal tool and a workpiece in response to the detected load to maintain an interactive force between the material removal tool and the workpiece between the programmed threshold values.

7. An electromechanical robotic material removal apparatus comprising:

a robot arm;

a housing defining an interior space and attached to a distal end of the robot arm, wherein said housing further includes an interior shoulder protruding inwardly from an interior surface of said housing;

an electromagnet disposed within the interior space of said housing, wherein the strength of the electromagnet is adjustable;

a follower disposed within the inside space of said housing including:

a disk-like portion magnetically attracted to said electromagnet and movably contacting the interior shoulder of said housing, and a shaft portion connected to the disk-like portion and defining a cylindrical hollow, wherein a lower end of said shaft portion protrudes from said housing and is fixed to a tool clamp for supporting a material removal tool; and an elastic element disposed within the cylindrical hollow of said follower and maintaining contact between said follower and the interior surface of said housing, wherein said elastic element allows said follower to move both linearly and angularly within the interior space of said housing.

* * * * *